United States Patent [19]

Nakamura

[11] Patent Number: 5,021,986

[45] Date of Patent: Jun. 4, 1991

[54] TOTAL SUM CALCULATION CIRCUIT CAPABLE OF RAPIDLY CALCULATING A TOTAL SUM OF MORE THAN TWO INPUT DATA REPRESENTED BY A FLOATING POINT REPRESENTATION

[75] Inventor: Toshihiko Nakamura, Yamanashi, Japan

[73] Assignee: NEC Corporation, Tokyo, Japan

[21] Appl. No.: 456,667

[22] Filed: Dec. 27, 1989

[30] Foreign Application Priority Data

Dec. 28, 1988 [JP] Japan .................................. 63-334316

[51] Int. Cl.$^5$ .............................................. G06F 7/38
[52] U.S. Cl. ..................................................... 364/748
[58] Field of Search ................... 364/748, 715.08, 745, 364/715.06; 340/146.2

[56] References Cited

U.S. PATENT DOCUMENTS

| 4,562,553 | 12/1985 | Mattedi et al. | 364/745 |
| 4,734,876 | 3/1988 | Williams | 364/748 X |
| 4,918,636 | 4/1990 | Iwata et al. | 364/715.06 |

Primary Examiner—Dale M. Shaw
Assistant Examiner—Tan V. Mai
Attorney, Agent, or Firm—Foley & Lardner

[57] ABSTRACT

A total sum calculation circuit for calculating a total sum of first through n-th input data represented by a floating point representation and which are composed of first through n-th exponent parts and first through the n-th fraction parts, where n is an integer greater than two. An n-input data comparison circuit simultaneously compares first through the n-th exponent parts with one another to produce a maximum one of the first through the n-th exponent parts and a comparison result signal representative of which one of the first through n-th exponent parts is the maximum exponent part. Supplied with the first through the n-th exponent parts and the comparison result signal, a shift number calculation circuit calculates first through n-th shift digit numbers between the maximum exponent part and the first through the n-th exponent parts. The first through the n-th fraction parts are shifted by first through n-th shift digit numbers in first through n-th shifters are produced as first through n-th shifted fraction parts summed up into an unnormalized fraction part which part is normalized into a total sum fraction part by normalization information derived from the unnormalized fraction part. The maximum exponent part is also normalized by the normalization information into a total sum exponent part. A combination of the total sum exponent part and the total sum fraction part is produced as the total sum represented by the floating point representation.

4 Claims, 4 Drawing Sheets

TOTAL SUM CALCULATION CIRCUIT CAPABLE OF RAPIDLY CALCULATING A TOTAL SUM OF MORE THAN TWO INPUT DATA REPRESENTED BY A FLOATING POINT REPRESENTATION

BACKGROUND OF THE INVENTION

This invention relates to a total sum calculation circuit which is capable of calculating a total sum of a plurality of input data, each of which is represented by a floating point representation.

In general, it often happens that a conventional total sum calculation circuit of the type described is used in summing up three or more input data represented by a floating point representation to provide a total sum of the three or more input data. In this event, such input data may be referred to without loss of generality as first through n-th input data, where n is an integer greater than two. On calculating the total sum of the first through the n-th input data, the conventional total sum calculation circuit at first sums up two of the input data to calculate a first intermediate sum, as will be described in detail with reference to one of several drawing figures of the accompanying drawing. Thereafter, another of the input data and the first intermediate sum are summed up by the conventional total sum calculation circuit to calculate a second intermediate sum. Similar operations are successively carried out (n−1) times as regards the respective input data to calculate the total sum of the first through the n-th input data. Therefore, it takes a long time to carry out such successive summations of the first through the n-th input data.

SUMMARY OF THE INVENTION

It is an object of this invention to provide a total sum calculation circuit which is capable of quickly calculating a total sum of first through n-th input data, where n is an integer greater than two.

It is another object of this invention to provide a total sum calculation circuit of the type described, which is capable of dispensing with successive similar operations carried out on calculating a total sum of the first through then-th input data.

A total sum calculation circuit to which this invention is applicable is for calculating a total sum of first through n-th input data, where n is an integer greater than two. The first through the n-th input data are represented by a floating point representation and composed of first through n-th exponent parts and first through n-th fraction parts while the total sum is composed of a total sum exponent part and a total sum fraction part. Each of the first through the n-th exponent parts and the total sum exponent part is represented by an exponent number of a base number. According to this invention, the total sum calculation circuit comprises comparing means for comparing the first through the n-th exponent parts with one another to detect a maximum exponent part from the first through the n-th exponent parts and to produce the maximum exponent part and a comparison result signal representative of which one of the first through the n-th exponent parts is the maximum exponent part, shift number calculation means supplied with the first through the n-th exponent parts and the comparison result signal for calculating first through n-th shift digit numbers of the first through the n-th exponent parts from the maximum exponent part, the first through the n-th shift digit numbers being for adjusting the exponent numbers of the first through the n-th exponent parts to the exponent number of the maximum exponent part, first through n-th shifters supplied with the first through the n-th fraction parts and the first through the n-th shift digit numbers for shifting the first through the n-th fraction parts on the basis of the first through the n-th shift digit numbers to produce first through n-th shifted fraction parts shifted by the first through the n-th shift digit numbers, respectively, summing means for summing the first through the n-th shifted fraction parts to calculate an unnormalized sum, normalization signal producing means coupled to the summing means for producing first and second information signals representative of information for normalizing the unnormalized sum, a shifter coupled to the summing means for shifting the unnormalized sum on the basis of the first information signal to produce a normalized sum, exponent calculation means supplied with the maximum exponent part and the second information signal for calculating an intermediate exponent part, and means for producing the intermediate exponent part and the normalized sum as the total sum exponent part and the total sum fraction part, respectively.

DESCRIPTION OF THE PREFERRED EMBODIMENTS

Figure 1:
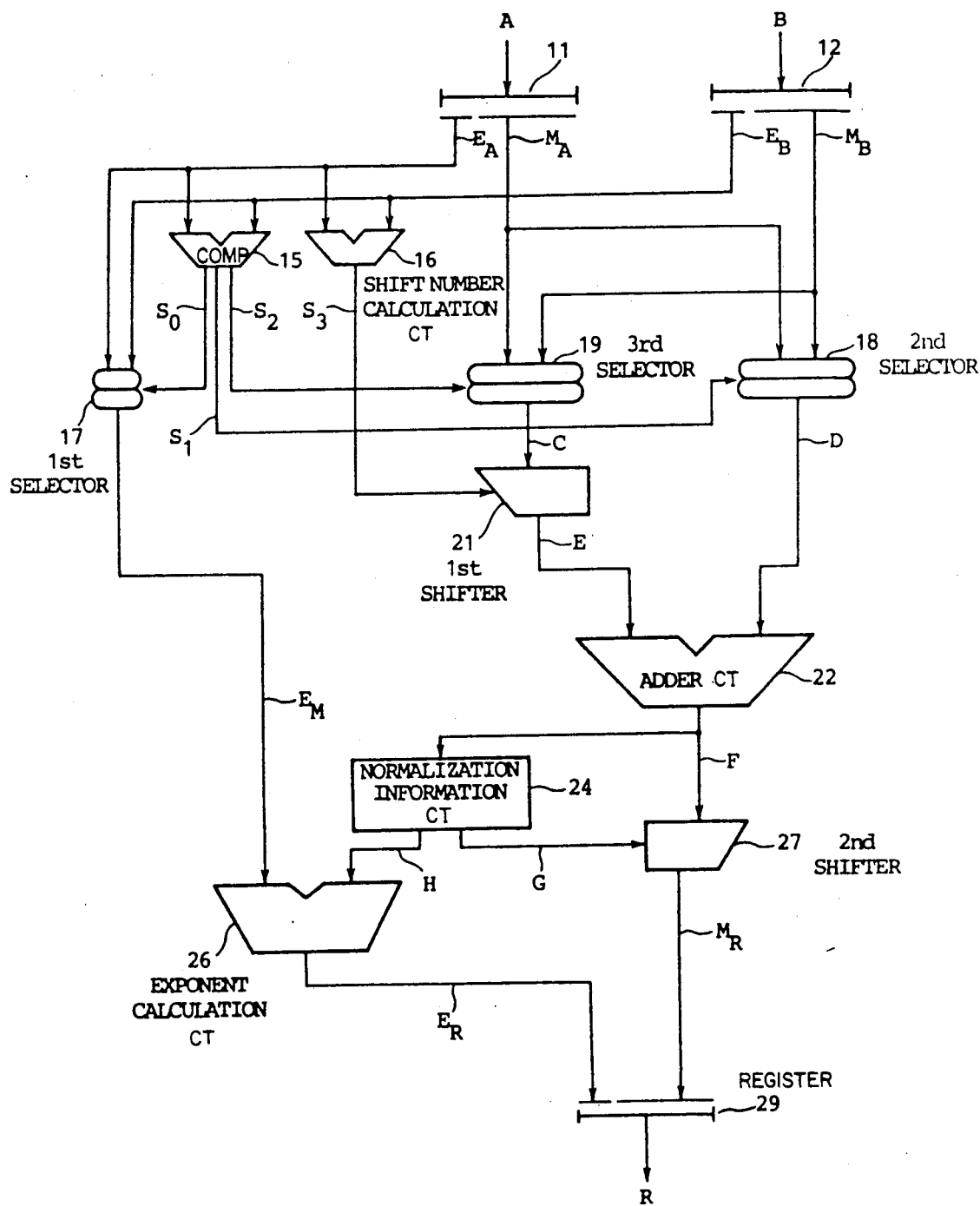
FIG. 1 is a block diagram of a conventional total sum calculation circuit which is used in calculating a total sum of a plurality of input data represented by a floating point representation.

Referring to FIG. 1, a conventional total sum calculation circuit will be described for a better understanding of this invention. The total sum calculation circuit is for use in calculating a total sum R of a plurality of input data represented by a floating point representation. The total sum is composed of a total sum exponent part and a total sum fraction part. Likewise, each of the input data is composed of an exponent part and a fraction part. Moreover, each of the first through the n-th exponent parts and the total sum exponent part is represented by an exponent number of a base number. For example, when the base number, the exponent number, and the fraction part are represented by B, e, and f, respectively, each of the input data and the total sum (denoted by X) is given by:

$$X = B^e \times f. \quad (1)$$

In Equation (1), the first factor of the righthand side is representative of an exponent part while the second factor is representative of a fraction part.

In FIG. 1, the illustrated total sum calculation circuit is at first supplied with two of the input data as first and second input data designated by A and B, respectively. The first and the second input data A and B are composed of first and second exponent parts EA and EB and first and second fraction parts MA and MB and are held in the first and second registers 11 and 12, respectively. Each of the first and the second fraction parts MA and MB has a plurality of digits and is specified by a digit number having a floating point.

The first and the second exponent parts EA and EB are supplied to a comparison circuit 15 for comparing the first and the second exponent parts EA and EB with each other. A shift number calculation circuit 16 is for calculating a shift number between the first and the second exponent parts EA and EB. A first selector 17 is controlled by the comparison circuit 15 in a manner to be described later.

More specifically, the illustrated comparison circuit 15 is operable to compare only the first and the second exponent parts EA and EB with each other and to judge which one of the first and the second exponent parts EA and EB is greater than the other. Such comparison can be carried out by comparing the exponent numbers of the first and the second exponent parts EA and EB with each other. As a result, the comparison circuit 15 produces first, second, and third comparison result signals $S_0$, $S_1$, and $S_2$ which may be called first through third selection signals, respectively. Each of the first through the third comparison signals $S_0$ to $S_2$ is representative of which one of the first and the second exponent parts EA and EB is greater than the other. The first comparison result signal $S_0$ is delivered to the first selector 17 while the second and the third comparison result signals $S_1$ and $S_2$ are sent to second and third selectors 18 and 19, respectively.

Supplied with the first comparison result signal $S_0$, the first selector 17 selects the greater one of the first and the second exponent parts EA and EB to produce a maximum exponent part EM.

On the other hand, each of the second and the third selectors 18 and 19 is supplied with the first and the second fraction parts MA and MB from the first and the second registers 11 and 12. Responsive to the second comparison result signal $S_1$, the second selector 18 selects either one of the first and the second fraction parts MA and MB that corresponds to the greater one of the first and the second exponent parts EA and EB indicated by the second comparison result signal $S_1$. Thus, the second selector 18 produces the selected one of the first and the second fraction parts MA and MB as a first selected fraction part D. Responsive to the third comparison result signal $S_3$, the third selector 19 selects either one of the first and the second fraction parts that corresponds to the smaller one of the first and the second exponent parts EA and EB. The third selector 19 produces the selected fraction part as a second fraction part C. Thus, the second fraction part C selected by the third selector 19 is concerned with the smaller one of the first and the second exponent parts EA and EB and must be shifted so as to make the floating point of the second fraction part C coincide with that of the first selected fraction part D. Otherwise, it is difficult to calculate an accurate sum of the input data represented by the floating point representation, as well known in the art. In this connection, the second fraction part C is sent from the third selector 19 to a first shifter 21 controlled by the shift number calculation circuit 16.

The shift number calculation circuit 16 is supplied with the first and the second exponent parts EA and EB to calculate a difference between the exponent numbers of the first and the second exponent parts Ea and EB. The difference between the exponent numbers is sent from the shift number calculation circuit 16 to the first shifter 21 as a digit number $S_3$ necessary for adjusting the digits of the first and the second fraction parts MA and MB. In other words, the digit number $S_3$ may serve to make the floating points of the first and the second fraction parts MA and MB coincide with each other. At any rate, the first shifter 21 produces a shifted fraction part E which is obtained by shifting the second fraction part C and which is delivered to an adder circuit 22 supplied with the first selected fraction part D. The adder circuit 22 adds the shifted fraction part E to the first selected fraction part D to produce a result F of addition.

It is to be noted that the result F of addition supplied from the adder circuit 22 is not normalized, as known in the art. Taking this into consideration, the result F of addition is sent from the adder circuit 22 to a normalization information circuit 24 which produces first and second normalization information signals G and H necessary for normalizing floating point data. The first normalization information signal G is representative of a digit number necessary for normalizing the result F of addition, namely, a fraction part while the second normalization information signal H is representative of an exponent number necessary for normalizing an exponent part.

The second normalization information signal H is sent to an exponent calculation circuit 26 together with the maximum exponent part EM. Specifically, the exponent calculation circuit 26 adds the exponent number of the maximum exponent part EM to the exponent number indicated by the second normalization information signal H, to produce a normalized exponent part ER.

On the other hand, the result F of addition is also sent to a second shifter 27 supplied with the first normalization information signal G. The result F of addition is shifted in the second shifter 27 by the first normalization information signal G to be produced as a normalized fraction part MR. Both the normalized fraction part MR and the normalized exponent part ER are registered in an output register 29 and are thereafter sent to an external device as the total sum R. In this connection, the normalized fraction part MR and the normalized exponent part ER may be referred to as the total sum fraction part and the total sum exponent part, respectively.

It is assumed that the total sum calculation circuit illustrated in FIG. 1 is used for calculating a total sum of first through n-th input data which are denoted by $A_1$, $A_2$, ..., $A_n$. In this event, the first and the second input data $A_1$ and $A_2$ are summed up to calculate a first intermediate sum represented by $B_2$. Subsequently, the first intermediate sum $B_2$ is added to the third input data $A_3$ to obtain a second intermediate sum $B_3$. Likewise, an $(i-1)$-th intermediate sum $B_{i-1}$ is added to an i-th input data $A_i$ to calculate an i-th intermediate sum $B_i$. This shows that the abovementioned operations should be repeated $(n-1)$-times to calculate the total sum $B_n$ of the first through the n-th input data $A_1$ to $A_n$. Thus, the conventional total sum calculation circuit should be repeatedly used for calculation of the total sum many times, which results in a reduction of throughput in the conventional total sum calculation circuit. In addition, a long time is required for calculating the total sum of the first through the n-th input data represented by the floating point representation, as mentioned above.

Figure 2:
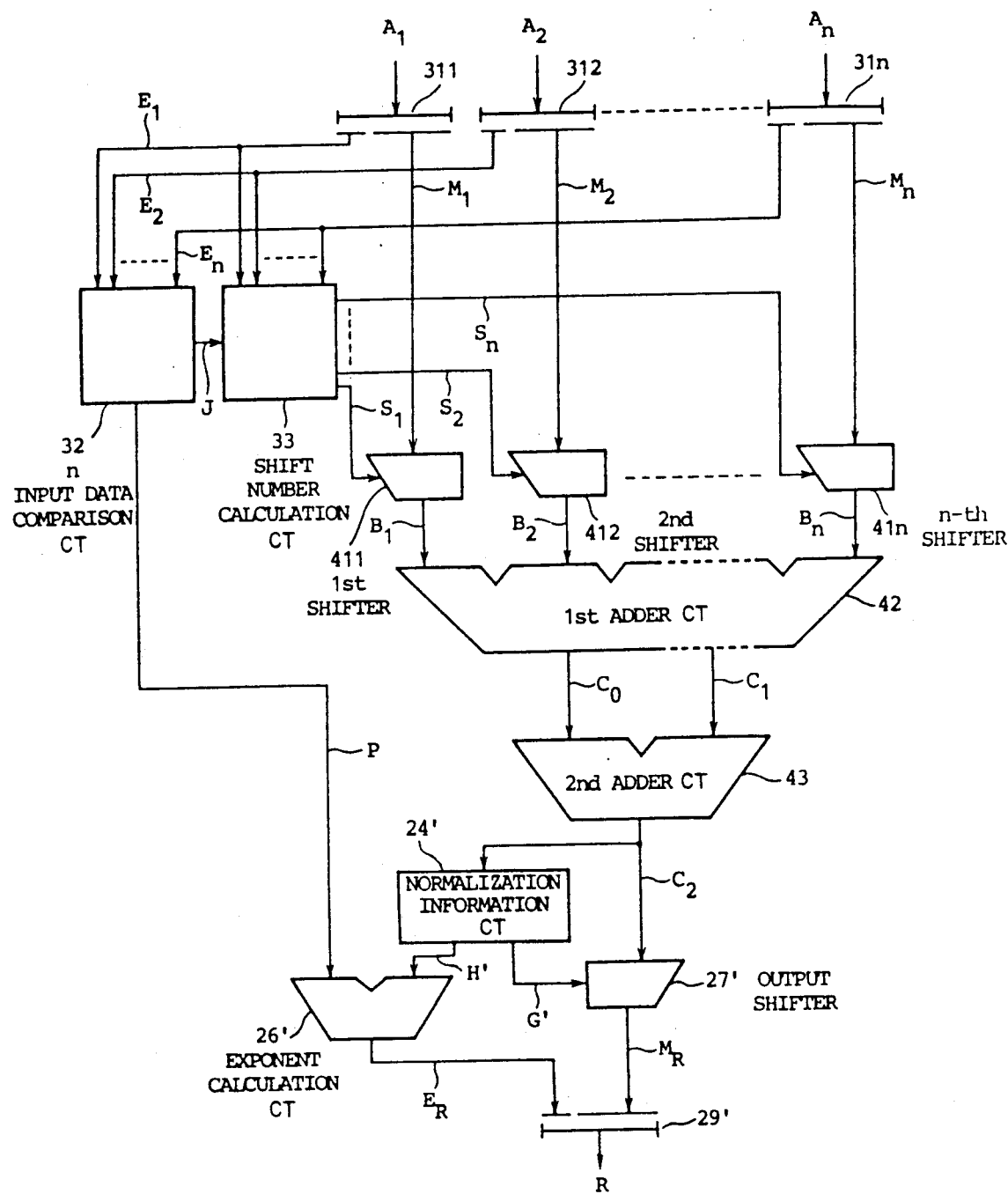
FIG. 2 is a block diagram of a total sum calculation circuit according to a first embodiment of this invention.

Referring to FIG. 2, a total sum calculation circuit according to a first embodiment of this invention comprises first through n-th input registers $31l$ to $31n$ supplied with first through n-th input data $A_1$ to $A_n$ which are represented by a floating point representation and which are sent from an external circuit (not shown) in parallel. The first through the n-th input data $A_1$ to $A_n$ can be represented by Equation (1) and are composed of first through n-th exponent parts $E_1$ to $E_n$ and first through n-th fraction parts $M_1$ to $M_n$, where n is an integer greater than two. In this connection, each of the first through the n-th exponent parts $E_1$ to $E_n$ can be represented by a base number and an exponent number, as in FIG. 1.

In FIG. 2, the first through the n-th input data $A_1$ to $A_n$ are sent from the first through the n-th input registers 31/ to 31n to an n-input data comparison circuit 32 and a shift number calculation circuit 33 operable in cooperation with the n-input data comparison circuit 32 in a manner to be described later.

Figure 3:
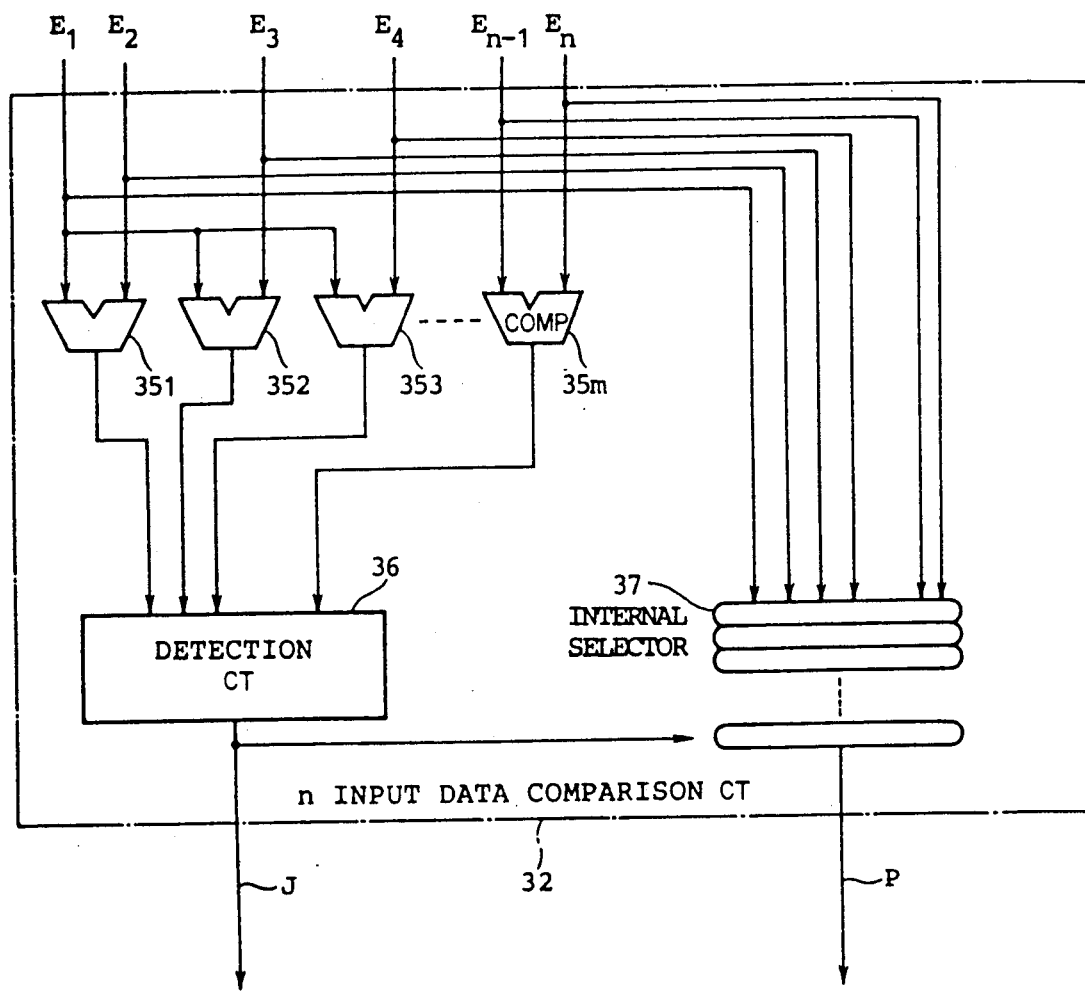
FIG. 3 is a block diagram of a part of the total sum calculation circuit illustrated in FIG. 2.

Referring to FIG. 3 together with FIG. 2, the n-input data comparison circuit 32 comprises first through m-th fractional comparators 351 to 35m, each of which is operable to compare two input data with each other, where m is equal in number to the combinations of n items of data taken two at a time, namely, $_nC_2$. From this fact, it is understood that the first, second, and third fractional comparators 351, 352, and 353 are supplied with the first and the second exponent parts $E_1$ and $E_2$, the first and the third exponents parts $E_1$ and $E_3$, and the first and fourth exponent parts $E_1$ and $E_4$, respectively, while the m-th fractional comparator 35m is supplied with (n−1)-th and n-th exponent parts $E_{n-1}$ and $E_n$. Thus, the first through the n-th exponent parts $E_1$ to $E_n$ are simultaneously compared with one another by the use of the first through the m-th fractional comparators 351 to 35m. More specifically, each of the first through the m-th fractional comparators 351 to 35m is given two exponent parts designated by $E_i$ and $E_j$, where each of i and j are between 1 and n, both inclusive, and i is not equal to j. Each of the first through the m-th fractional comparators 351 to 35m thereby detects that either one of the two exponent parts is greater than the other to produce first through m-th results of comparison which are equal in number to $_nC_2$ and which are sent to a detection circuit 36.

The detection circuit 36 detects which one of the first through the m-th results of comparison indicates a maximum exponent part and produces a comparison result signal J representative of which one of the first through the n-th exponent parts $E_1$ to $E_n$ in the maximum exponent part. It is readily possible to detect such a maximum exponent part by monitoring the first through the m-th results of comparison. Accordingly, the detection circuit 36 will not be described any further. The comparison result signal J is sent to an internal selector 37 supplied with the first through the n-th exponent parts $E_1$ to $E_n$. The comparison result signal J is indicative of the maximum exponent part and can be used as a selection signal for selecting the maximum exponent part, as mentioned before. As a result, the internal selector 37 selects the maximum exponent part from the first through the n-th exponent parts $E_1$ to $E_n$ to produce the maximum exponent part as an output exponent part P.

Turning back to FIG. 2, the comparison result signal J is delivered from the n-input data comparison circuit 32 to the shift number calculation circuit 33 which is supplied with the first through the n-th exponent parts $E_1$ to $E_n$, as mentioned before. The shift number calculation circuit 33 calculates first through n-th shift numbers $S_1$ to $S_n$ on the basis of the comparison result signal J sent from the n-input data comparison circuit 32. The first through the n-th shift numbers $S_1$ to $S_n$ are representative of digit numbers necessary for making the respective fraction parts $M_1$ to $M_n$ coincide with the fraction part of the input data having the maximum exponent part. In this event, a selected one of the first through the n-th shift numbers $S_1$ to $S_n$ may be equal to zero. The first through the n-th shift numbers $S_1$ to $S_n$ are sent to first through n-th shifters 411 to 41n which are supplied with the first through the n-th fraction parts $M_1$ to $M_n$, respectively. As a result, the first through the n-th fraction parts $M_1$ to $M_n$ are shifted in response to the first through the n-th shift numbers $S_1$ to $S_n$ to make the floating points of the respective fraction parts coincide with one another and are supplied to a first adder circuit 42 as first through n-th shifted fraction parts denoted by $B_1$ to $B_n$.

Operation of the shift number calculation circuit 33 will now be described in detail for a better understanding of this invention. For example, the maximum exponent part is assumed to be selected from the first through the n-th exponent parts $E_1$ to $E_n$ and to be represented by $E_j$, where j is not smaller than unity and not greater than n. In this case, the first shift number $S_1$ for the first input data $A_1$ is represented by:

$$S_1 = |E_1 - E_j|.$$

Likewise, an i-th shift number $S_i$ for an i-th fraction part $M_i$ of the input data $A_i$ is given by:

$$S_i = |E_i - E_j|,$$

where i = 1, 2, ..., and n.

At any rate, the shift number calculation circuit 33 supplies the first through the n-th shifters 411 to 41n with the first through the n-th shift numbers $S_1$ to $S_n$ calculated in the above-mentioned manner. The first through the n-th fraction parts $M_1$ to $M_n$ are shifted towards most significant digits on the basis of the shift numbers $S_i$ in the first through the n-th shifters 411 to 41n and are sent to the first adder circuit 42 as the first through the n-th shifted fraction parts $B_1$ to $B_n$. The first adder circuit 42 sums up the first through the n-th shifted fraction parts $B_1$ to $B_n$ to produce first and second partial sums $C_0$ and $C_1$ given by:

$$C_0 + C_1 = B_1 + B_2 + \ldots + B_n.$$

The first and the second partial sums $C_0$ and $C_1$ are sent from the first adder circuit 42 to a second adder circuit 43. The second adder circuit 43 sums up the first and the second partial sums $C_0$ and $C_1$ to produce a sum $C_2$ which is represented by:

$$C_2 = C_0 + C_1.$$

The sum $C_2$ calculated by the second adder circuit 43 is representative of a fraction part of the total sum unnormalized and may be called an unnormalized fraction part of the total sum of the first through the n-th input data $A_1$ to $A_n$. The unnormalized fraction part $C_2$ is delivered from the second adder circuit 43 to both a normalization information circuit 24' and an output shifter 27' which are operable in a manner similar to the normalization information circuit 24 and the second shifter 27 illustrated in FIG. 1. The normalization information circuit 24' produces first and second normalization information signals G' and H' necessary for a fraction part and an exponent part, respectively, like that illustrated in FIG. 1. The first and the second normalization information signals G' may represent, for example, an overflow value of a fraction part and a leading count zero value of an exponent part and are delivered to the output shifter 27' and an exponent calculation circuit 26', respectively.

Supplied with the unnormalized fraction part $C_2$ and the first normalization information signal G', the output shifter 27' shifts the unnormalized fraction part $C_2$ either towards a least significant digit or towards a most significant digit in response to the first normalization information signal G' and produces a normalized fraction part as the total sum fraction part MR. More specifically, the unnormalized fraction part $C_2$ is shifted in the output shifter 27' by a single digit towards the least significant digit when an overflow of a single digit occurs in the unnormalized fraction part. When no overflow occurs in the unnormalized fraction part and the leading zero count value indicates a single digit, the output shifter 27' shifts the unnormalized fraction part $C_2$ by a single digit towards the most significant digit.

Furthermore, the exponent calculation circuit 26' is supplied with the maximum exponent part P and the second normalization information signal H'. When an overflow of a single digit occurs in the unnormalized fraction part, a single digit is added to the maximum exponent part P. On the other hand, when the leading zero count value indicates a single digit, the exponent calculation circuit 26' subtracts a single digit from the maximum exponent part P. At any rate, the exponent calculation circuit 26' produces a normalized exponent part ER which is a total sum exponent part of the total sum R.

The normalized fraction part MR and the normalized exponent part ER are sent from the output shifter 27' and the exponent calculation circuit 26' to an output register 29' and produced as the total sum R represented by the floating point representation.

Figure 4:
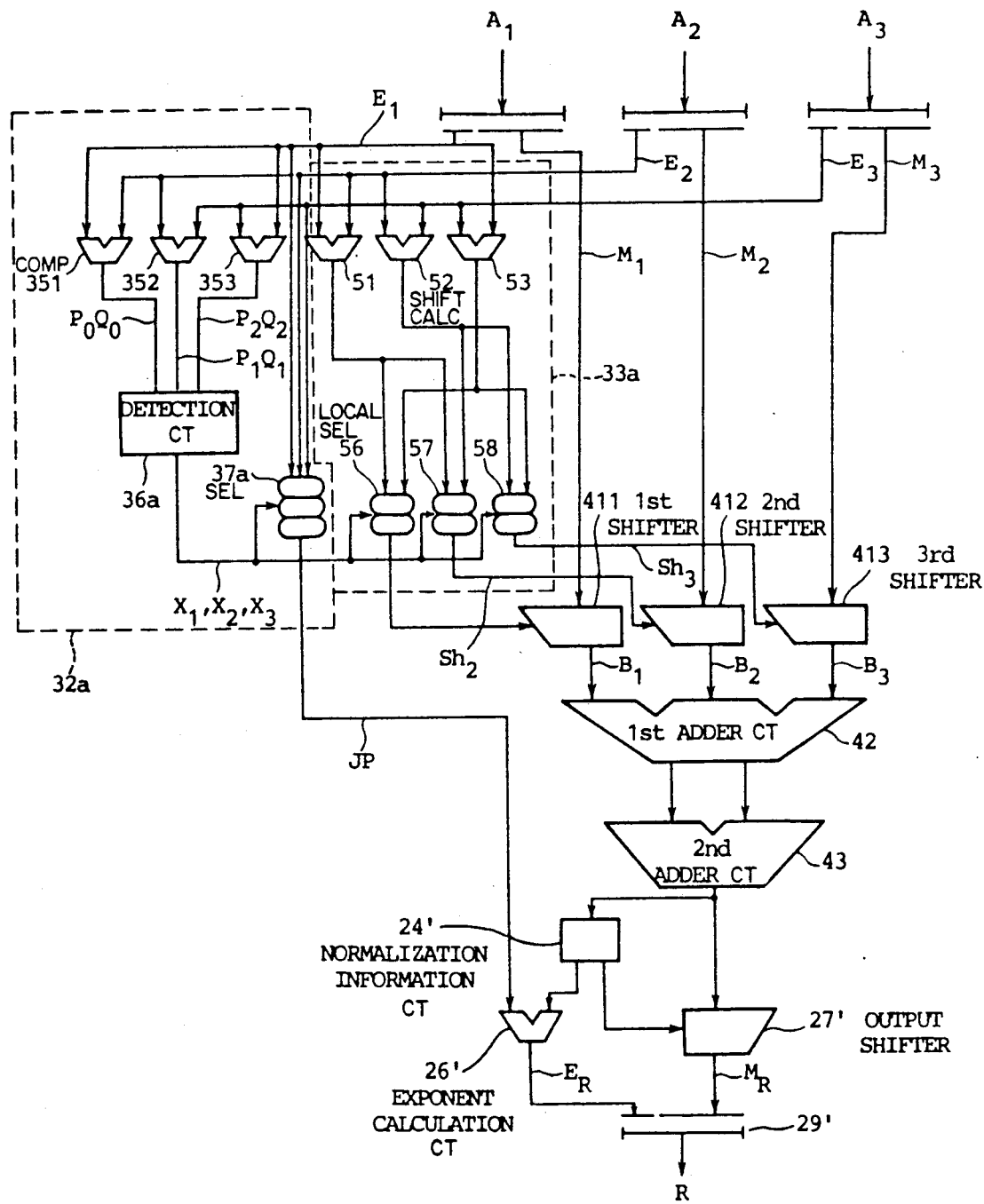
FIG. 4 is a block diagram of a total sum calculation circuit according to a second embodiment of this invention.

Referring to FIG. 4, a total sum calculation circuit 40 according to a second embodiment of this invention is for use in calculating a total sum R of first through n-th input data $A_1$ to $A_n$ represented by a floating point representation, where n is equal to three. In this connection, the first through the third input data $A_1$ to $A_3$ are supplied to the illustrated total sum calculation circuit and are composed of first through third exponent parts $E_1$ to $E_3$ and first through third fraction parts $M_1$ to $M_3$. The total sum calculation circuit illustrated in FIG. 4 is similar to that illustrated in conjunction with FIGS. 2 and 3 except that a three-input data comparison circuit 32a and a shift number calculation circuit 33a are somewhat modified from those illustrated in FIGS. 2 and 3. Therefore, description will be mainly directed to the three-input data comparison circuit 32a and the shift number calculation circuit 33a hereinunder.

In FIG. 4, the three-input data comparison circuit 32a comprises first through third fractional comparators 351 to 353, each of which is supplied with two of the first through the third exponent parts $E_1$ to $E_3$ of the first through the third input data $A_1$ to $A_3$. Specifically, the first fractional comparator 351 is given the first and the second exponent parts $E_1$ and $E_2$ while the second fractional comparator 352 is given the second and the third exponent parts $E_2$ and $E_3$. The third fractional comparator 353 is given the first and the third exponent parts $E_1$ and $E_3$. The first through the third fractional comparators 351 to 353 produce first through third results of comparison. The first through the third results of comparison are represented by a pair of bits depicted at $(P_0, Q_0)$, $(P_1, Q_1)$, and $(P_2, Q_2)$, respectively.

In the example being illustrated, the bits $(P_0, Q_0)$ of the first result are $(0, 1)$ when the first exponent part $E_1$ is smaller than the second exponent part $E_2$. On the other hand, when the first exponent part $E_1$ is greater than the second exponent part $E_2$, the bits $(P_0, Q_0)$ of the first result become equal to $(1, 0)$. Furthermore, when the first and the second exponent parts $E_1$ and $E_2$ are equal to each other, the bits $(P_0, Q_0)$ become $(1, 1)$.

Similarly, the second fractional comparator 352 produces $(1, 0)$ and $(0, 1)$ as the two bits $(P_1, Q_1)$ when the second exponent part $E_2$ is greater and smaller than the third exponent part $E_3$, respectively. As in the first fractional comparator 351, the second fractional comparator 352 produces the two bits $(P_1, Q_1)$ of $(1, 1)$ when the second and the third exponent parts $E_2$ and $E_3$ become equal to each other. In a like manner, the third fractional comparator 353 produces the two bits $(P_2, Q_2)$ of $(1, 0)$ and $(0, 1)$, when the third exponent part $E_3$ is smaller and greater than the first exponent part $E_1$, respectively. When the third exponent part $E_3$ is equal to the first exponent part $E_1$, the two bits $(P_2, Q_2)$ of the third result of comparison are specified by $(1, 1)$.

The first through the third results $(P_0, Q_0)$, $(P_1, Q_1)$, and $(P_2, Q_2)$ are sent from the first through the third fractional comparators 351 to 353 to a detection circuit 36a which is similar to the detection circuit 36 illustrated in FIG. 3 and which produces a detection signal of first through third bits denoted by $(X_1, X_2, \text{ and } X_3)$. The first through the third bits of the detection signal may be made to correspond to the first through the third exponent parts $E_1$ to $E_3$, respectively. More particularly, the first through the third bits $(X_1, X_2, \text{ and } X_3)$ of the detection signal become $(1, 0, 0)$, $(0, 1, 0)$, and $(0, 0, 1)$ when the first through the third exponent parts $E_1$ to $E_3$ are detected as the maximum exponent part, respectively. Moreover, when the second and the third exponent parts $E_2$ and $E_3$ are detected as the maximum exponent part, the first through the third bits $(X_1, X_2, X_3)$ becomes $(0, 1, 1)$. When the first and the third exponent parts $E_1$ and $E_3$ are judged as the maximum exponent part, the first through the third bits $(X_1, X_2, X_3)$ are $(1, 0, 1)$. Likewise, the first through the third bits $(X_1, X_2, X_3)$ take $(1, 1, 1)$ when the first through the third exponent parts are all equal to one another. In order to produce, as the detection signal, the first through the mentioned above, the illustrated detection circuit 36a may be implemented by logic circuits which are specified by:

$$X_1 = P_0 Q_2,$$

$$X_2 = P_1 Q_0,$$

and $$X_3 = P_2 Q_1.$$

Such logic circuits can be readily designed and realized by those skilled in the art and will not be described any further.

The detection signal of the first through the third bits is delivered from the detection circuit 36a to an internal selector 37a which is similar in operation to that illustrated in FIG. 3. The internal selector 37a selects the maximum exponent part J on the basis of the first through the third bits $(X_1, X_2, X_3)$ of the detection signal. As a result, the maximum exponent part J is sent through the internal selector 37a to the exponent calculation circuit 26' described with reference to FIG. 2.

As shown in FIG. 4, the shift number calculation circuit 33a comprises a first shift calculator 51 supplied with the first and the second exponent parts $E_1$ and $E_2$, respectively, a second shift calculator 52 supplied with the second and the third exponent parts $E_2$ and $E_3$, and a third shift calculator 53 supplied with the third and the first exponent parts $E_3$ and $E_1$. The first through the third shift calculators 51 to 53 calculate differences of absolute values between the first and the second exponent parts $E_1$ and $E_2$, between the second and the third exponent parts $E_2$ and $E_3$, and between the third and the first exponent parts $E_3$ and $E_1$ to produce first through third difference signals $S_0$ to $S_2$ representative of the differences, respectively. From this fact, it is readily understood that the first through the third difference signals $S_0$ to $S_2$ are represented by:

$$S_0 = |E_1 - E_2|, \quad (2)$$

$$S_1 = |E_2 - E_3|, \quad (3)$$

and $$S_2 = |E_3 - E_1|. \quad (4)$$

The first difference signal $S_0$ is sent from the first shift calculator 51 to first and second local selectors 56 and 57 while the second difference signal $S_1$ is sent from the second shift calculator 52 to the second local selector 57 and a third local selector 58. Additionally, the third difference signal $S_2$ is delivered from the third shift calculator 53 to the third and the first local selectors 58 and 56. As illustrated in FIG. 4, the first through the third local selectors 56 to 58 are controlled by the detection signal of the first through the third bits ($X_1$, $X_2$, $X_3$). In general, the number of the shift calculators may be equal to m.

More particularly, the first local selector 56 selects the third difference signal $S_2$ when the maximum exponent part J is the third exponent part $E_3$, namely, the first through the third bits ($X_1$, $X_2$, $X_3$) are equal to (0, 0, 1). The first difference signal $S_0$ is selected by the first local selector 56 when the maximum exponent part J is the second exponent part, namely, the first through the third bits ($X_1$, $X_2$, $X_3$) are equal to (0, 1, 0) while the first or the third difference signal $S_0$ or $S_2$ is selected when each of the second and the third exponent parts $E_2$ and $E_3$ is the maximum exponent part, namely, the first through the third bits ($X_1$, $X_2$, $X_3$) specify (0, 1, 1). In addition, when any other combinations of the first through the third difference signals $S_0$ to $S_2$ are given from the first through the third shift calculators, the first local selector 56 selects or produces zero.

On the other hand, the second local selector 57 selects the second difference signal $S_1$ when the maximum exponent part J is the third exponent part $E_3$, namely, the first through the third bits ($X_1$, $X_2$, $X_3$) specify (0, 0, 1). The first difference signal $S_0$ is selected by the second local selector 57 when the maximum exponent part J is the first exponent part $E_1$, namely, the first through the third bits ($X_1$, $X_2$, $X_3$) are equal to (1, 0, 0). When each of the first and the third exponent parts $E_1$ and $E_3$ is the maximum exponent part J, namely, the first through the third bits ($X_1$, $X_2$, $X_3$) take (1, 0, 1), the first or the second difference signal $S_0$ or $S_1$ is selected by the second local selector 57. Except for the above-mentioned cases, the second local selector 57 produces zero.

In addition, the third local selector 58 selects the second difference signal $S_1$ when the maximum exponent part J is the second exponent part $E_2$, namely, ($X_1$, $X_2$, $X_3$) = (0, 1, 0). The third difference signal $S_2$ is selected by the third local selector 58 when the maximum exponent part is the first exponent part $E_1$. When each of the first and the second exponent parts $E_1$ and $E_2$ is the maximum exponent part, namely, ($X_1$, $X_2$, $X_3$) = (1, 1, 0), the second or the third difference signal $S_1$ or $S_2$ is selected by the third local selector 58. Except for the above-mentiod cases, the third local selector 58 produces zero.

Such first through third local selectors 56 to 58 can be readily structured by a known logic circuit technique and will not be described any further.

With this structure, the internal selector 37a selects the maximum exponent part J from the first through the third exponent parts $E_1$ to $E_3$ in response to the detection signal ($X_1$, $X_2$, $X_3$). On the other hand, the first through the third shift calculators 51 to 53 calculate shift digit numbers given by the differences to produce the first through the third difference signals $S_0$ to $S_2$, respectively.

Herein, it will be assumed that the third exponent part $E_3$ is the maximum exponent part and that the first through the third bits ($X_1$, $X_2$, $X_3$) of the detection signal therefore take (0, 0, 1). As mentioned above, the first local selector 56 is supplied with the first and the third difference signals $S_0$ and $S_2$. When the third exponent part $E_3$ is maximal, the third difference signal $S_2$ is selected by the first local selector 56 in response to the first through the third bits of the detection signal and is produced as a first shift digit number $Sh_1$.

On the other hand, the second local selector 57 is supplied with the first and the second difference signals $S_0$ and $S_1$ and with the first through the third bits (0, 0, 1). In this case, the second local selector 57 selects the second difference signal $S_1$ represented by Equation (3) in response to the first through the third bits. As a result, the second local selector 57 produces the second difference signal $S_1$ as a second shift digit number $Sh_2$. Likewise, the third local selector 58 is supplied with the second and the third difference signals $S_1$ and $S_2$ along with the first through the third bits of (0, 0, 1). In this event, the third local selector 58 produces zero as a third shift digit number Sh3.

The first through the third shift digit numbers $Sh_1$ to $Sh_3$ are delivered to first through third shifters 411 to 413, respectively. As a result, the first through the third shifters 411 to 413 shift the first through the third fraction parts $M_1$ to $M_3$ in response to the first through the third shift digit numbers $Sh_1$ to $Sh_3$ and produces first through third shifted fraction parts $B_1$ to $B_3$, respectively. The first through the third shifted fraction parts $B_1$ to $B_3$ are processed through the first and the second adder circuits 42 and 43 and the output shifter 27' in a manner similar to that illustrated in FIG. 2 to produce the normalized fraction part MR as the total sum fraction part. As in FIG. 2, the normalized exponent part ER is produced through the exponent calculation circuit 26' under control of the normalization information circuit 24'. Thus, the output register 29' produces a total sum represented by the floating point representation as in FIG. 2.

While this invention has thus far been described in conjunction with a few embodiments thereof, it will readily be possible for those skilled in the art to put this invention into practice in various other embodiments. For example, the first and the second adder circuits 42 and 43 may be combined into a single adder circuit.

What is claimed is:

1. A total sum calculation circuit for calculating a total sum of first through n-th input data, where n is an integer greater than two, said first through said n-th input data being represented by a floating point representation and being composed of first through n-th exponent parts and first through n-th fraction parts while said total sum is composed of a total sum exponent part and a total sum fraction part, each of said first through said n-th exponent parts and said total sum exponent part being represented by an exponent number of a base number, said total sum calculation circuit comprising:

comparing means for comparing said first through said n-th exponent parts with one another to detect a maximum exponent part from said first through said n-th exponent parts and to produce said maximum exponent part and a comparison result signal representative of which one of said first through said n-th exponent parts is said maximum exponent part;

shift number calculation means supplied with said first through said n-th exponent parts and said comparison result signal for calculating first through n-th shift digit numbers of said first through said n-th exponent parts from said maximum exponent part, said first through said n-th shift digit numbers being for adjusting the exponent numbers of said first through said n-th exponent parts to the exponent number of said maximum exponent part;

first through n-th shifters supplied with said first through said n-th fraction parts and said first through said n-th shift digit numbers for shifting said first through said n-th fraction parts on the basis of said first through said n-th shift digit numbers to produce first through n-th shifted fraction parts shifted by said first through said n-th shift digit numbers, respectively;

summing means for summing said first through said n-th shifted fraction parts to calculate an unnormalized sum;

normalization signal producing means coupled to said summing means for producing first and second information signals representative of information for normalizing said unnormalized sum;

a shifter coupled to said summing means for shifting said unnormalized sum on the basis of said first information signal to produce a normalized sum;

exponent calculation means supplied with said maximum exponent part and said second information signal for calculating an intermediate exponent part; and means for producing said intermediate exponent part and said normalized sum as said total sum exponent part and said total sum fraction part, respectively.

2. A total sum calculation circuit as claimed in claim 1, wherein said comparing means comprises:

first through m-th fractional comparators each of which is for comparing two exponent parts selected from said first through said n-th exponent parts with each other to produce first through m-th results of comparison which are representative of which one of said two exponent parts is greater than the other, where m is equal in number to the combinations of n items of data taken two at a time;

detecting means supplied with said first through said m-th results of comparison for detecting which one of said first through said n-th exponent parts is said maximum exponent part to produce said comparison result signal; and selection means supplied with said first through said n-th exponent parts and said comparison result signal for selecting said maximum exponent part from said first through said n-th exponent parts.

3. A total sum calculation circuit as claimed in claim 2, wherein said shift number calculation means comprises:

first through m-th shift number calculators each of which is for calculating first through m-th differences between two exponent parts selected from said first through said n-th exponent parts to produce first through m-th shift number signals specified by said first through said m-th differences, respectively; and signal supplying means supplied with said first through said m-th shift number signals for supplying said first through said n-th shift digit numbers to said first through said n-th shifters to make said first through said n-th shifters produce said first through said n-th shifted fraction parts, respectively.

4. A total sum calculation circuit as claimed in claim 3, wherein said summing means comprises:

first adder means supplied with said first through said n-th shifted fraction parts for adding said first through said n-th shifted fraction parts to one another to produce first and second partial sums; and second adder means for adding said first and said second partial sums to each other to produce said unnormalized sum.

* * * * *